No. 671,428. Patented Apr. 9, 1901.
J. E. BACON.
WATER RAISING APPARATUS.
(Application filed Jan. 14, 1895.)
(No Model.)
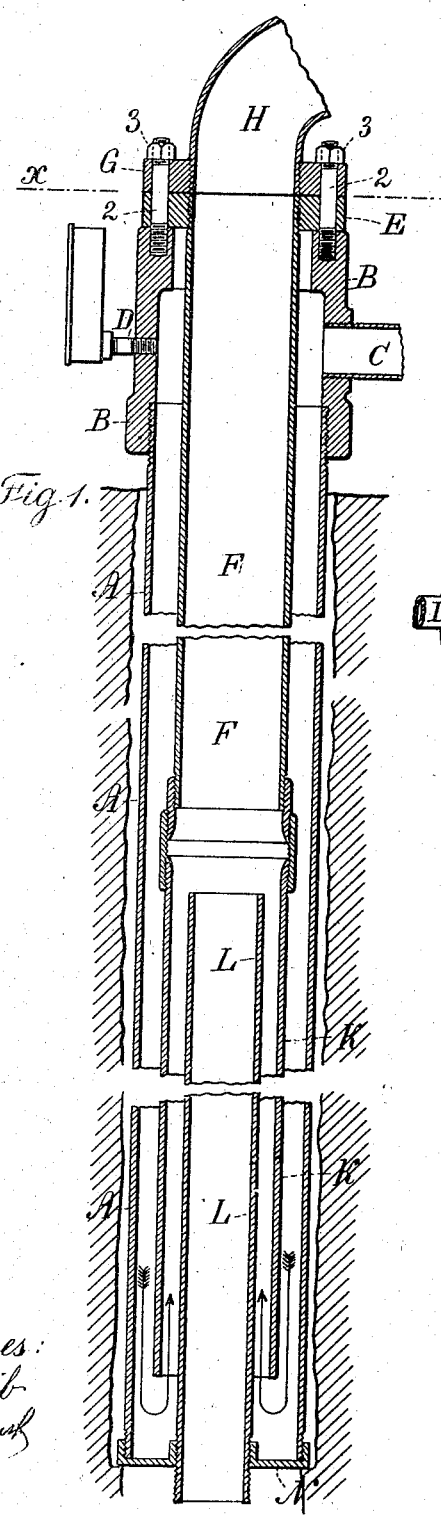
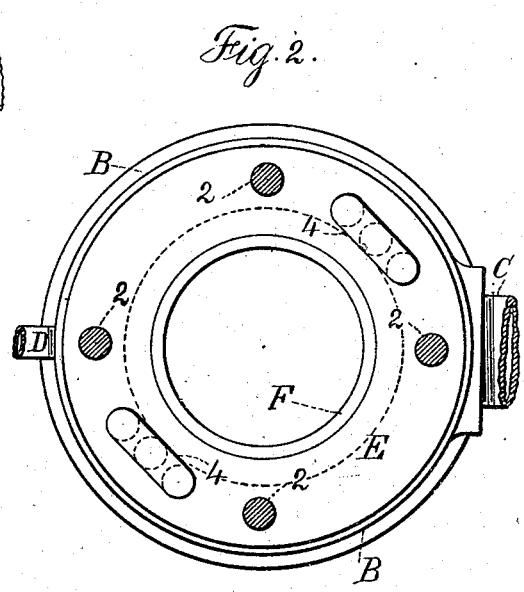
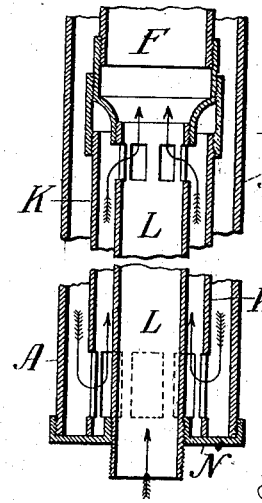
Witnesses:
J. Staib
Chas. H. Smith
Inventor:
James E. Bacon
by Lemuel W. Serrell
Atty

UNITED STATES PATENT OFFICE.

JAMES E. BACON, OF RICHMOND, VIRGINIA, ASSIGNOR TO BACON AIR LIFT COMPANY, OF NEW JERSEY.

WATER-RAISING APPARATUS.

SPECIFICATION forming part of Letters Patent No. 671,428, dated April 9, 1901.

Application filed January 14, 1895. Serial No. 534,733. (No model.)

*To all whom it may concern:*

Be it known that I, JAMES E. BACON, a citizen of the United States, residing at Richmond, in the county of Henrico and State of Virginia, have invented an Improvement in Water-Raising Apparatus, of which the following is a specification.

In water-raising apparatus I have heretofore made use of a descending pipe or the well-lining for air under pressure, that acts to lighten the column of water in an uptake-pipe within the air-reservoir.

The present improvement is made with reference to connecting the larger pipe that forms the reservoir for air or other fluid under pressure with the uptake-pipe that is within such air-reservoir, so as to make a tight joint between the two pipes and to easily couple the discharge-nozzle at the upper end of the uptake-pipe and allow for the separation of parts with facility whenever the uptake-pipe requires to be removed.

In the drawings, Figure 1 is a vertical section representing the two end portions of the water-raising apparatus. Fig. 2 is a plan view below the line x x, Fig. 1, of the head or cap for connecting the respective pipes; and Fig. 3 represents a modification in the supply-pipe.

The well is to be bored in any ordinary manner, and the tube A represents either the lining of the well, that extends down below the lower end of the uptake-pipe F, or else there may be a pipe passing down within the well-lining, so as to be removable from the well without disturbing the lining, and this pipe A forms the outside of the annular chamber, that contains air or other fluid under pressure for raising the water, and upon the top of this tube A the head B is screwed, and in such head is a screw-threaded opening for a pipe C, through which air or other fluid under pressure is introduced, and it is usual to provide a screw-threaded hole for the pressure-gage at D. The top surface of the head B is turned off true and preferably flat, and upon it rests the flange E, which is in the form of a ring screwed upon the upper end of the uptake-pipe F, and the discharge-pipe H, which usually is curved for the delivery of the water, is screwed upon the flange G, which is similar to the flange E, and the surfaces are turned off true, so that such surfaces will be air-tight either by the weight of the respective parts resting one on the other or by the clamping-bolts 2 with the nuts 3, such bolts being screwed into the upper end of the head B and the nuts 3 clamping the parts together, and red lead or similar material may be introduced between the surfaces to render them air-tight.

It will be apparent that the uptake-pipe F passes freely through the contracted upper end of the head B, and hence when the nuts 3 are removed the parts can be separated, and the flange E and uptake-pipe F can be drawn up by a derrick, as usual in wells of this character, so as to take out the uptake-pipe whenever required for repairs or otherwise, and with this object in view I provide eyebolts 4 in screw-threaded holes in the ring-flange E, which eyebolts are removed previous to placing the flange G upon such head or flange E.

At the lower end of the uptake-pipe F there is a tubular enlargement K, properly proportioned for the air to pass between its exterior surface and the interior of the tube A, and the lower end of this tubular enlargement K is either open or slotted for the free passage of the air under pressure, and the supply-tube L for the liquid passes through the annular head N up into the tubular enlargement K, and it may terminate with a flat open end, as seen in Fig. 1, or it may be screwed into the coupling or reducer between the lower end of the uptake-pipe F and the top end of the tubular enlargement K, there being openings at the upper end of such supply-tube L and within the tubular enlargement K, as seen in Fig. 3.

It will now be understood that when the parts are at rest the liquid in the well will rise in the pipe A and within the uptake-pipe F to the external level of the liquid, and when air under pressure is forced into the pipe A the liquid will be driven down in such pipe A, and the pressure of air must be sufficient to drive down the liquid until such air reaches the lower end of the tubular enlargement K, and it will then rise rapidly within the enlargement K and aerate or drive upwardly the water within the uptake-pipe F, and the liquid in the well will continue to rise through the supply-tube L and be aerated, so as to pass up through the pipe F to the place of delivery, the higher column being sufficiently reduced in weight by the air contained therein for the pressure of the column of water in the well to cause the liquid to rise to the place of delivery.

By this improvement the water-raising apparatus is cheaply and reliably constructed, and the whole of it can be drawn up out of the well with facility whenever required and taken apart or replaced for use.

In practice it is found of great advantage to close the lower end of the well-tube A by the annular head N to prevent the surging of the water up and down in such well-tube, because under all circumstances the pressure of the air has to be sufficient to drive down the column of water to the place where the air enters the uptake-pipe, and if the lower end of the well-tube is open the water will rush into the well-tube as soon as the escaping air may lessen the pressure, and thus the water would surge up and down the well-tube if the lower end of such well-tube A were left open.

After a well has remained out of action for some time there is usually an accumulation of sediment, that interferes with the proper flow of the liquid, and to clear this out requires a sudden and violent agitation of the contents of the well. By the construction herein described I am enabled to use the pipe L, passing through the lower head or flange N, and the uptake-pipe F, which is connected with the head or flange G and is easily removable, and this uptake-pipe can be lengthened with facility by one or more joints of pipe, so that the lower end passes down to any desired depth, and when air-pressure is admitted between the well-tube A and the uptake-pipe F the pressure displaces the column of water before the air can reach the lower end of the uptake-pipe, and this excessive pressure as it escapes upwardly is sufficient to produce a violent agitation in the water of the well and carry off sediment and open up seams and channels and start the well flowing at its maximum capacity. After this has been done the pipe F can be shortened as much as consistent with the relative levels of the water, so as to aerate the ascending column and carry it up to the place of delivery with as little pressure of air as possible and a consequent saving in the power made use of while the well is operated continuously and in the usual manner.

I do not herein claim a supply-tube passing up into the lower end of the uptake-pipe, as this has been employed as a permanent connection to the surrounding tube or casing.

I claim as my invention—

The combination with the well-tube having an annular bottom head and the water-supply tube passing through the same, of the uptake-pipe having a tubular enlargement and the reducer between the enlargement and uptake-pipe and the supply-tube, the said supply-tube being slotted near its upper end, substantially as specified.

Signed by me this 8th day of January, 1895.

J. E. BACON.

Witnesses:
E. S. BEANTON,
C. E. BUCK.